(12) United States Patent
Cagle

(10) Patent No.: US 11,019,815 B2
(45) Date of Patent: Jun. 1, 2021

(54) GAME CALL SYSTEM

(71) Applicant: Samuel D. Cagle, Mequon, WI (US)

(72) Inventor: Samuel D. Cagle, Mequon, WI (US)

( * ) Notice: Subject to any disclaimer, the term of this patent is extended or adjusted under 35 U.S.C. 154(b) by 389 days.

(21) Appl. No.: 16/051,425

(22) Filed: Jul. 31, 2018

(65) Prior Publication Data

US 2019/0037830 A1 Feb. 7, 2019

Related U.S. Application Data

(60) Provisional application No. 62/542,000, filed on Aug. 7, 2017.

(51) Int. Cl.
*A01M 31/00* (2006.01)
*A01M 31/06* (2006.01)

(52) U.S. Cl.
CPC .......... *A01M 31/004* (2013.01); *A01M 31/06* (2013.01)

(58) Field of Classification Search
CPC .......................... A01M 31/004; A01M 31/06
See application file for complete search history.

(56) References Cited

U.S. PATENT DOCUMENTS

| | | | | |
|---|---|---|---|---|
| 5,036,614 A * | 8/1991 | Jackson | ................. | A01M 31/06 43/3 |
| 5,168,649 A * | 12/1992 | Wright | ................. | A01M 31/06 43/2 |
| 5,233,780 A * | 8/1993 | Overholt | ............... | A01M 31/06 43/2 |
| 5,459,958 A * | 10/1995 | Reinke | .................. | A01M 31/06 43/2 |
| 5,636,466 A * | 6/1997 | Davis | .................... | A01M 31/06 43/3 |
| 6,053,793 A * | 4/2000 | Green | ................. | A01M 31/004 446/188 |
| 8,230,638 B1 * | 7/2012 | Dunaway | .............. | A01M 31/06 43/2 |
| 8,250,801 B2 * | 8/2012 | Elpi | ...................... | A01M 31/06 43/3 |
| 9,044,006 B1 * | 6/2015 | O'Neil | .................. | A01M 31/06 |
| 9,565,851 B2 * | 2/2017 | Peoples | ............... | A01M 31/004 |
| 2004/0194365 A1 * | 10/2004 | Summers | .............. | A01M 31/06 43/2 |
| 2008/0295381 A1 * | 12/2008 | Barr | ...................... | A01M 31/06 43/2 |
| 2009/0007479 A1 * | 1/2009 | Jerome, Sr. | ........... | A01M 31/06 43/2 |
| 2011/0232153 A1 * | 9/2011 | Jennings, Jr. | ......... | A01M 31/06 43/2 |
| 2012/0042561 A1 * | 2/2012 | Bain | ..................... | A01M 31/06 43/3 |
| 2012/0240447 A1 * | 9/2012 | Gurner, III | ............. | F16M 11/28 43/2 |
| 2015/0208641 A1 * | 7/2015 | Gurner, III | ............. | F16M 11/18 43/2 |

* cited by examiner

*Primary Examiner* — Richard G Davis
(74) *Attorney, Agent, or Firm* — Rathe Lindenbaum LLP

(57) ABSTRACT

A remote game call system may include a game call and an actuator for remotely actuating the game call.

23 Claims, 10 Drawing Sheets

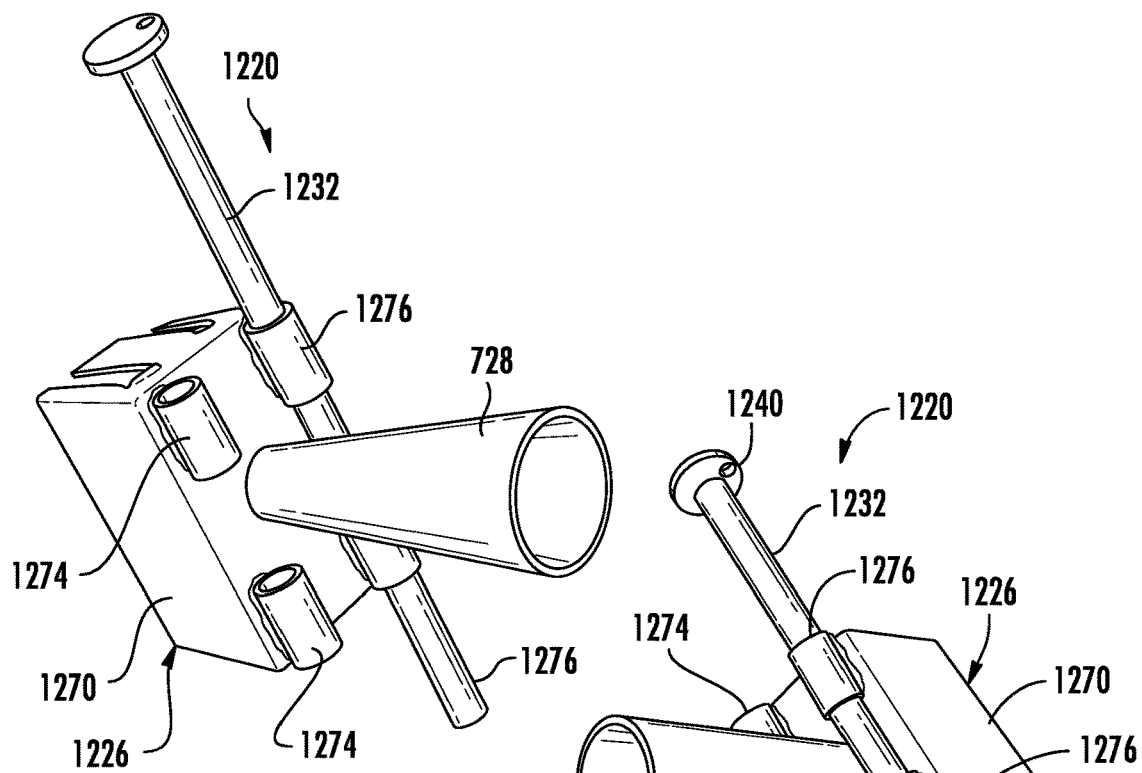
FIG. 15
FIG. 16
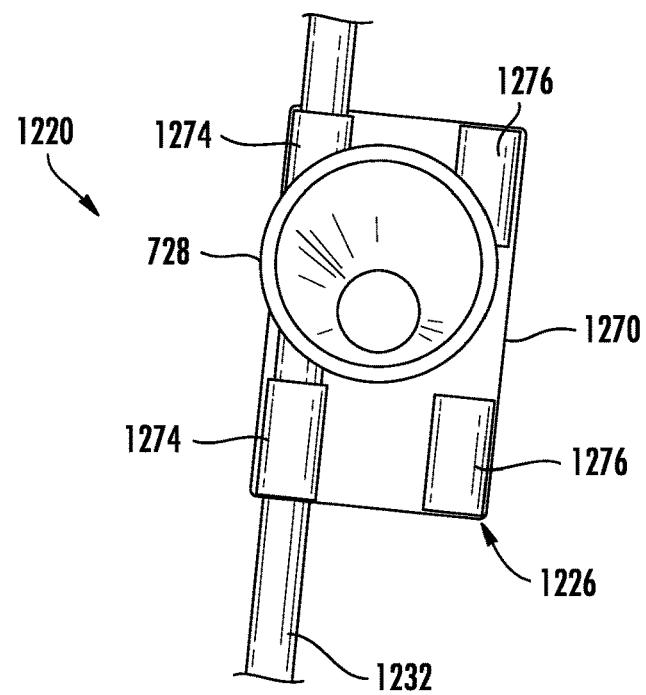
FIG. 17

GAME CALL SYSTEM

CROSS-REFERENCE TO RELATED APPLICATIONS

The present application is a non-provisional US patent application claiming priority under 35 USC § 119 from U.S. provisional patent application 62/542,000 filed on Aug. 7, 2017 by Samuel D. Cagle and entitled GAME CALL SYSTEM, the full disclosure of which is hereby incorporated by reference.

BACKGROUND

Game calls comprise devices by which a hunter or wildlife observer may simulate the natural sounds of wildlife to attract a targeted game to the source of the simulated sounds. In contrast to recordings of natural sounds of wildlife, which are often prohibited by various regulations, game calls may utilize friction, vibration or other sound producing mechanisms that approximate or simulate the natural sounds.

BRIEF DESCRIPTION OF THE DRAWINGS

FIG. 15 is a front top perspective view of the game call retainer and megaphone of FIG. 14 is mounted upon an example carrier.

FIG. 16 is a front bottom perspective view of the game call retainer and megaphone of FIG. 14 is mounted upon an example carrier.

FIG. 17 is a front perspective view of the game call retainer and megaphone of FIG. 14 mounted upon an example carrier.

Figure 1:
FIG. 1 is a schematic diagram of an example remote game call system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Game calls are frequently used by hunters and wildlife observers to attract game such as deer, wolves and various fowl, such as duck, geese and Turkey. In contrast to recordings of natural sounds of game, which are often prohibited by various regulations, game calls may utilize friction, vibration or other sound producing mechanisms that approximate or simulate the natural sounds. The simulated sounds produced by the game call may be simulated sounds of the same species of game being targeted. For example, when targeting a male or female of the species of game, the simulated sounds may be that of the opposite sex of the same species of game. In other implementations, the simulated sounds produced by the game call may be simulated sounds of a different species than that of the game being targeted. For example, the simulated sounds produced by the game call may be simulated sounds of a wounded prey that may attract the targeted game. For purposes of this disclosure, the term "call" refers to a device that is not a recording of a natural sound produced by a targeted game, but is a device that simulates the natural sound produced by a targeted game.

Such game calls create game attracting sounds through manual manipulation of the game call or by a person blowing into or withdrawing air from the game call. Actuation of the game call is local, meaning that the hunter or wildlife observer is adjacent to the game call during the creation of the game attracting sounds. Although the game attracting sounds may attract the targeted game, the game attracting sounds may also draw the game's attention to the hunter or wildlife observer interacting with the game call, possibly frightening the game or deterring approach by the game.

Disclosed herein are example game call systems that facilitate remote actuation of the game call. As a result, a hunter or wildlife observer may remain distant from the game call when actuating the game call to produce the simulated game sounds. The hunter wildlife observer may remain camouflaged or hidden in brush or other forage while actuating the game call which is remote from the hunter wildlife observer. For purposes of this disclosure, the term "local" with respect to the hunter or wildlife observer means within arm's reach of the hunter or wildlife observer, generally no greater than 4 feet. For purposes of this disclosure, the term "remote" with respect to the hunter or wildlife observer means out of his arm's reach, generally greater than 4 feet. In one implementation, the example game call systems facilitate positioning of the game call at least 10 feet from the hunter or wildlife observer. In other implementations, the example game call systems facilitate positioning of the game call at least 20 feet from the hunter a wildlife observer.

FIG. 1 schematically illustrates portions of an example game call system 20 that facilitates remote positioning of the game call with respect to the person that selectively actuates the game call. System 20 comprises game call 24 and remote actuator 40. Game call 24 comprises a device that simulates the natural sound of a targeted game. In one implementation, game call 24 comprise devices to make the natural sound produced by the vocal cords of a targeted game. Game call 24 may have various forms. For example, with respect to fowl, such as turkey, game call 24 may comprise a box call, a friction call, a push-pull call, a tube call, a wing bone call or a diaphragm call, types of turkey calls, types of calls typically used by hunters or wildlife observers while adjacent or local with respect to the call.

Remote actuator 40 comprises a device that actuates game call 24, causing game call 24 to produce the simulated natural sound targeting the game. Remote actuator 40 facilitates the positioning of game call 24 at a position remote from remote actuator 40, allowing the hunter wildlife observer to remain hidden behind forage, trees or camouflage. In one implementation, grown actuator 40 comprises a flexible line having a first end connected to the game call 24 and a second end remote from the first and, second end being pullable, against a bias, by the concealed hunter or wildlife observer to actuate the game call 24 to produce the simulated sounds. In one implementation, a spring or other bias returns a game call 24 and the flexible line to the default, pre-actuation state, upon the hunter wildlife observer releasing or removing tension on the flexible line. Examples of a flexible line include fishing line, paracord, string, wire or other lines that may extend along the ground which may be placed in tension by a person pulling on the flexible line.

In another implementation, remote actuator 40 comprises an electrically powered actuation driver local to the game call 24, wherein the electrically powered actuation driver provides motion our physical displacement that causes the game call 24 to produce the simulated sounds. In one implementation, the electrically powered actuation driver may move one member of game call 24 relative to another member of game call 24, wherein resulting friction between the two members create the simulated sound. In another implementation, the electrically powered actuation driver may open a valve that releases a gas, such as from a source of compressed gas, wherein the released gas flows across or relative to a diaphragm, reed or other structure to produce the simulated sounds.

In one implementation, the electrically powered actuation driver is remotely actuated by electrical signals transmitted across an electrical line having a first end connected to the electrically powered actuation driver and a second end connected to a remote controller having a pushbutton, switch or other input mechanism by which a person may trigger the production of the same simulated sounds by game call 24. In yet another implementation, the electrically powered actuation driver comprises a wireless transceiver which receives wireless signals from a remote controller, triggering the actuation of the electrically powered actuation driver and triggering the output of the simulated sounds. For example, in one implementation, remote actuator 40 may comprise a Bluetooth receiver connected to the electrically powered actuation driver, wherein a remote electronic device, such as a Bluetooth enabled smart phone may output wireless signals causing the electric powered actuation driver to drive game call 24 and produces simulated sounds.

Figure 2:
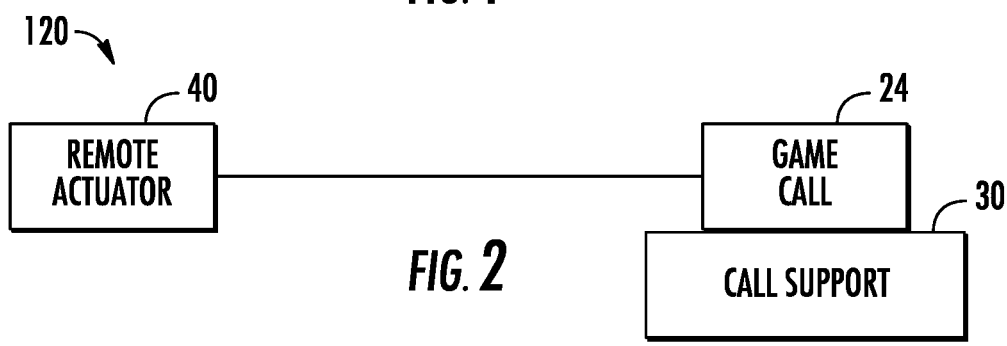
FIG. 2 is a schematic diagram of an example remote game call system.

FIG. 2 schematically illustrates portions of another example game call system 120. Game call system 120 is similar to game call system 20 described above except that game call system 120 additionally comprises call support 30. Those remaining components of system 120 which correspond to components of system 20 are numbered similarly.

Call support 30 comprise a device that supports the game call 24 relative to a stabilizing structure. In one implementation, call support 30 comprises a ground support that supports call 24 relative to the underlying ground. For example, in one of limitation, call support 30 may comprise a stake having a ground engaging portion and a support portion extending from the ground engaging portion, the support portion elevating game call 24 above the ground. In another implementation, call support 30 comprises a device to mount game call 24 to a tree, building or other structure rising from the ground. In implementations where remote actuator 40 comprises a flexible line, call support 30 retains game call 24 in place as game call 24 experiences the force of the flexible line being pulled by the hunter or wildlife observer to produce the simulated sounds.

Figure 3:
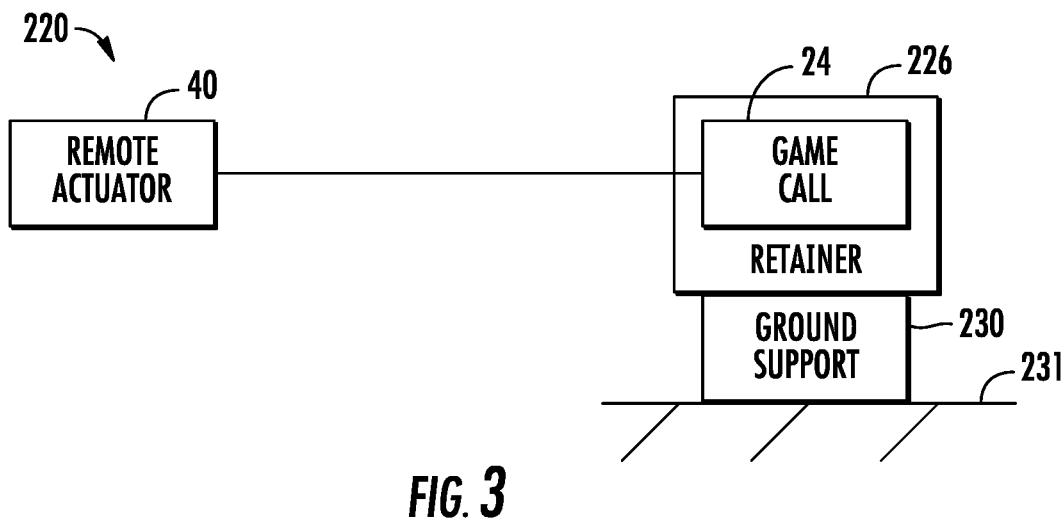
FIG. 3 is a schematic diagram of an example remote game call system.

FIG. 3 schematically illustrates portions of another example game call system 220. Game call system 220 is similar to game call system 20 except that game call system 220 comprises retainer 226 and a call support in the form of ground support 230. Retainer 226 comprise a device that at least partially encloses game call 24 and facilitates securement of game call 24 to ground support 230. Retainer 226 further facilitates actuation of game call 24 by remote actuator 40.

In one implementation, retainer 226 comprises a box, cage or other enclosure having openings or slots through which remote actuator 40 may interact with game call 24. In such an implementation, retainer 226 facilitates insertion and withdrawal of game call 24 into and from retainer 226 for easy exchange of game call 24 or removal of game call 24 through the simple opening of the door, latch, book or other device. In such implementation, retainer 226 allows a person to withdraw game call 24 from retainer 226 and locally utilize or locally actuate game call 24 when desired. In another implementation, retainer to six may comprise a bracket, platform, hanger or other device fastened, permanently or temporarily to game call 24.

Ground support 230 comprise a structure coupled to retainer 226 that secures retainer 226 with respect to the underlying terrain or ground 231. Ground support 230 may comprise a ground engaging portion and a support portion that extends above the ground. The ground engaging portion may comprise a stake or other structure that is pushed into the ground. In another implementation, ground engaging portion may comprise a platform, bracket or base that rests on top of the ground. In some implementations, the ground engaging portion may comprise a combination of ground inserting stakes and an above ground base.

Ground support 230 facilitates the use of system 220 by the hunter or wildlife observer simply positioning retainer 226 in place at a desired location. In implementations where retainer 226 removably receives game call 24, such as a cage or box, system 220 permits ground support 230 and retainer 226 to be left in place between different hunting or wildlife observation sessions while game call 24, which may be more susceptible to whether or the elements, is withdrawn from retainer 226.

Figure 4:
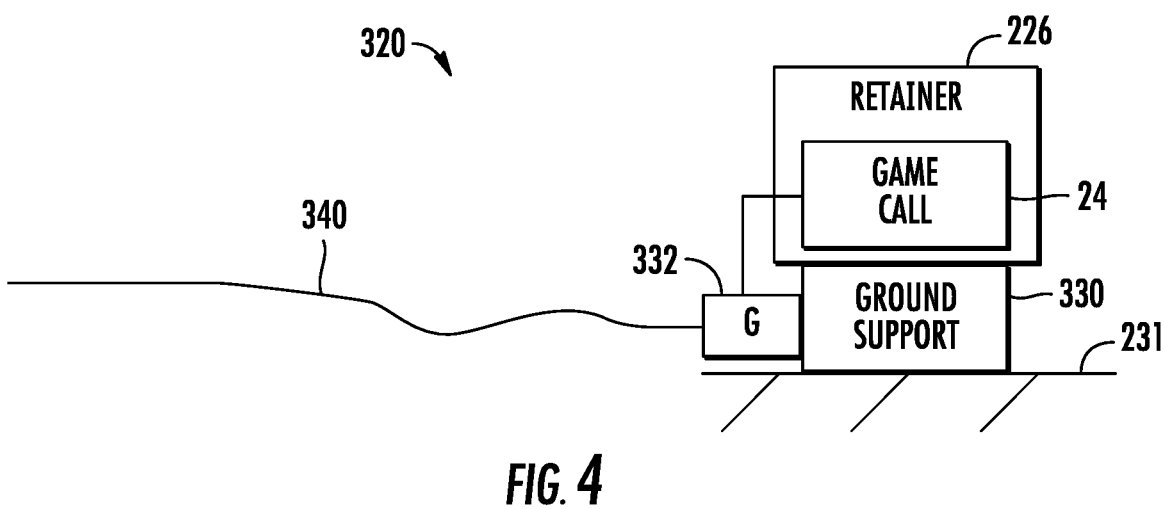
FIG. 4 is a schematic diagram of an example remote game call system.

FIG. 4 schematically illustrates portions of another example game call system 320. System 320 is similar to system 220 described above except the system 320 comprises ground support 330 and remote actuator 340. Ground support 330 similar ground support 230 described above except that ground support 320 additionally comprises guide G 332. Guide 332 comprise a structure that guides the sliding a reciprocating movement of a flexible line forming remote actuator 40. Guide 332 direct the travel of the flexible line from proximate or adjacent grounded 231 and turning the flexible line in an upward direction to the elevated game call 24. Guide 332 allows the flexible line forming remote actuator re-40 to extend vertically along ground support 330, proximate the ground support 330 and proximate to the ground 231 so as to be more inconspicuous. Guide 332 further directs the force applied during the tensioning of the flexible line such that the force is exerted upon the actuation mechanisms of game call 24 in an appropriate direction to actuate game call 24. In the example illustrated, guide 332 translates the generally horizontal tensioning force applied by the remote hunter a wildlife observer to a downwardly directed vertical force along ground support 230 to pull an actuation mechanism of game call 24 in a downward direction and thereby actuate game call 24. In one implementation, guide 322 may comprise one or more rings, loops, hooks or other line guiding structures.

Figure 5:
FIG. 5 is a schematic diagram of an example remote game call system.

FIG. 5 schematically illustrates portions of another example game call system 420. Game call system 420 is similar to game call system 20 described above except that game call system 420 additionally comprises game decoy 450. Game call decoy 450 comprises a simulated body or portion of a body of wildlife to attract the targeted game. In one implementation, game call decoy 450 comprises a two-dimensional panel or sheet having a shape and printing a graphics that depict the wildlife that is to attract the targeted game. In another implementation, game call decoy 450 comprises a three-dimensional body of the wildlife that is to attract the targeted game. In one implementation, the wildlife being simulated by the decoy is of the same species as a targeted game. For example, in one implementation, the decoy comprises a female turkey or hen that is to attract a male turkey or tom/gobbler. In one implementation, wildlife being simulated is that of a wounded prey of the targeted game.

In one implementation, game call 24 is positioned alongside or adjacent game decoy 450. In yet another implementation, game call 24 is supported by game decoy 450. In some implementations, game call 24 is surrounded or at least partially surrounded by game decoy 450. For example, in some implementations, game decoy 450 may have a hollow interior that receives game call 24.

Figure 6:
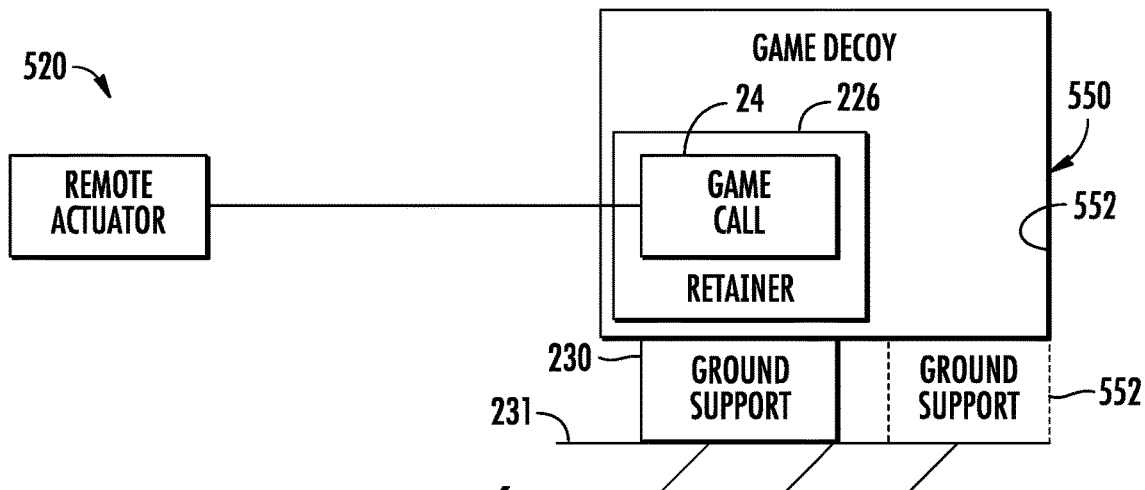
FIG. 6 is a schematic diagram of an example remote game call system.

FIG. 6 schematically illustrates portions of another example game call system 520. Game call system 520 is similar to game call system 220 described above except that game call system 520 comprises game decoy 550. Game decoy 550 is similar to game decoy 450 except that game decoy 550 specifically comprises a three-dimensional body having a hollow interior 552 that contains or receives game call 24 which itself is received or supported by retainer 226. In the example illustrated, ground support 230 supports retainer 226 which supports game call 24. Ground support 230 additionally supports game decoy 550, directly or indirectly. As shown by broken lines, in some implementations, retainer 226 and game call 24 may be supported by ground support 230 as described above while a separate additional ground support 530 supports game decoy 550. Ground support 530 may be similar ground support 230 described above except the ground support 530 extends from ground 231 and elevates game decoy 550.

Figure 7:
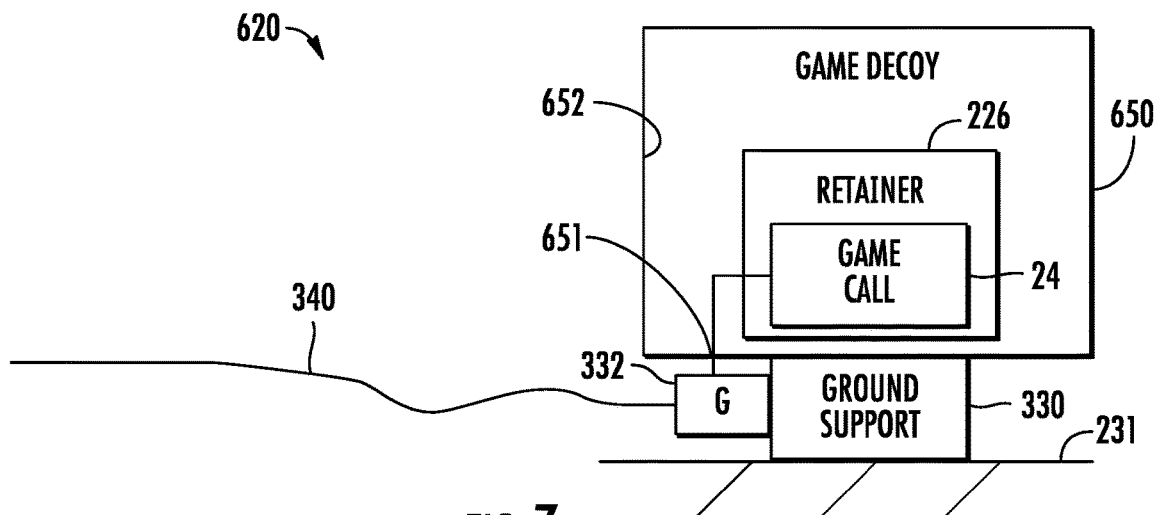
FIG. 7 is a schematic diagram of an example remote game call system.

FIG. 7 schematically illustrates portions of another example game call system 620. Game call system 620 is similar to game call system 320 described above except that game call system 620 additionally comprises game decoy 650. Game decoy 650 is similar to game decoy 550 except that game decoy 650 has an opening or port 651 which communicates with the interior 652 of decoy 650. Port 651 facilitates the extension of flexible line 340 into the interior 652 of game decoy 650 and into a connected state with game call 24, whether through retainer 226 or whether connected to portions of game call 24 projecting beyond retainer 226.

Figure 8:
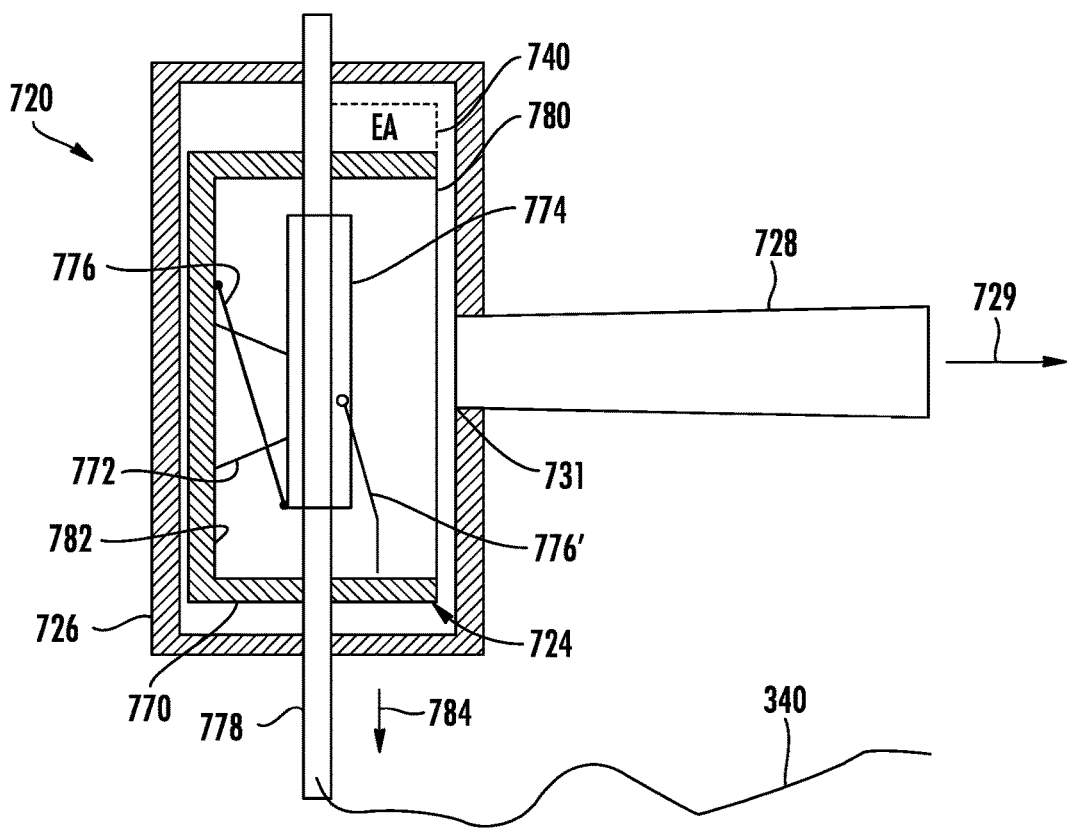
FIG. 8 is a sectional view of an example game call system.

FIG. 8 is a sectional view schematically illustrating portions of an example game call system 720. Game call system 720 comprises game call 724 retainer 726, megaphone 728 and remote actuator 340 (described above). In some implementations, system 720 may additionally comprise a ground support such as ground support 230 or 330, guide 332 and/or a game decoy such as game decoy 450, 550 or 650 as described above.

Game call 724 comprises a push-pull or pushbutton box game call. In the example illustrated, game call 724 comprises an open box 770, a pillar 772, a paddle 774, a bias 776 and a dowel or rod 778. Box 770 has a mouth 780 directing the generated sound produced by game call 724. Pillar 772 extends from a floor 782 of box 770. Paddle 774 rest upon pillar 772 and is urged against pillar 772 by bias 776.

In one implementation, bias 766 comprises a rubber band having one end secured to paddle 774 and a second end secured to floor 782. In other implementations, bias 776 may comprise other biasing structures, such as springs or the like. For example, in one implementation, as shown in broken lines, call 724 may alternatively comprise a bias 776' comprising a resiliently flexible or bendable wire having one end portion secured to a side of paddle 774 (sometimes referred to as a striker) and having a second end portion bearing against an internal side of box 770, the wire being in a compressed or resiliently bent state, compressing paddle 774 against pillar 772 and further resiliently biasing paddle 774 in one direction along the axis of rod 778. In another implementation, bias 766 may comprise an axial compression spring captured between paddle 774 and interior side of box 770 to resiliently bias paddle 774 in one direction along the axis of rod 778. Bias 776 provides paddle 774 with proper tension as the rides over pillar 772. Bias 776 further resiliently returns rod 778 to a default position ready for being pushed or pulled once again during actuation to generate a turkey call sound.

Rod 778 is coupled to paddle 774 and projects through openings in the sides of box 770. Rod 770 slides through such openings as paddle 774 slides across pillars 772. One end of rod 778 is coupled to remote actuator 340, in the form of a flexible line. Upon flexible line 340 being pulled by remote operator, rod 778 moves in a downward direction as indicated by arrow 784, sliding paddle 774 against pillar 772 in the same direction, against the force of bias 776. The friction between pillars 774 and pillars 772 creates a turkey call sound. In some implementations, at least one of the opposing surfaces of pillars 774 and pillar 772 may be provided with chalk or other friction and noise enhancing materials. Upon release of remote actuator 340, lessening of tension in the flexible line, bias 776 returns paddle 7742 an initial state. In some implementations, noise is additionally generated during the return of paddle 774.

As indicated by broken lines, in some implementations, remote actuator 340 may be replaced with an electronic actuator 740. Electronic actuator 740 may comprise an electric motor that drives the worm screw to linearly move rod 778 and paddle 774 relative to pillar 772. In another implementation, electronic actuator 740 may comprise an electric solenoid that drives rod 778 and pillars 774. As described above, in one implementation, the electronic actuator 740 may be actuated through a wired connection to a remote controller. In yet another implementation, electronic actuator 740 may be actuated through wireless signals transmitted from a wireless mode controller, such as through a Bluetooth connection with a smart phone.

Retainer 726 is similar to retainer 226 described above. Retainer 726 at least partially encloses game call 724 and facilitates securement of game call 724 to a stabilizing structure, such as a call support 30 or a ground support 230. Retainer 726 further facilitates actuation of game call 724 by remote actuator 340/740.

In one implementation, retainer 726 comprises a box, cage or other enclosure having openings or slots through which remote actuator 340 may interact with game call 724. In such an implementation, retainer 726 facilitates insertion and withdrawal of game call 724 into and from retainer 726 for easy exchange of game call 724 or removal of game call 774 through the simple opening of the door, latch, book or other device. In such implementation, retainer 726 allows a person to withdraw game call 724 from retainer 726 and locally utilize or locally actuate game call 724 when desired. In another implementation, retainer 726 may comprise a bracket, platform, hanger or other device fastened, permanently or temporarily to game call 724.

Megaphone 728 comprises a funnel-shaped device for amplifying and directing sound produced by turkey call 724. Megaphone 728 directs the sound further in the direction indicated by arrow 729. In the example illustrated, megaphone 728 have a smaller end 731 supported opposite to opening 780 of box 770. In the example illustrated, the smaller and 731 is mounted to retainer 726 with the interior of megaphone 728 communicating with the interior of retainer 726 and the interior of box 770. In other implementations, megaphone 728 may be omitted. In some implementations, those portions of retainer 726 opposite to opening 780 of box 770 may be open or may comprise multiple openings or perforations for the transmission of sound produced by the friction during relative movement of paddle 774 and pillar 772.

Figure 9:
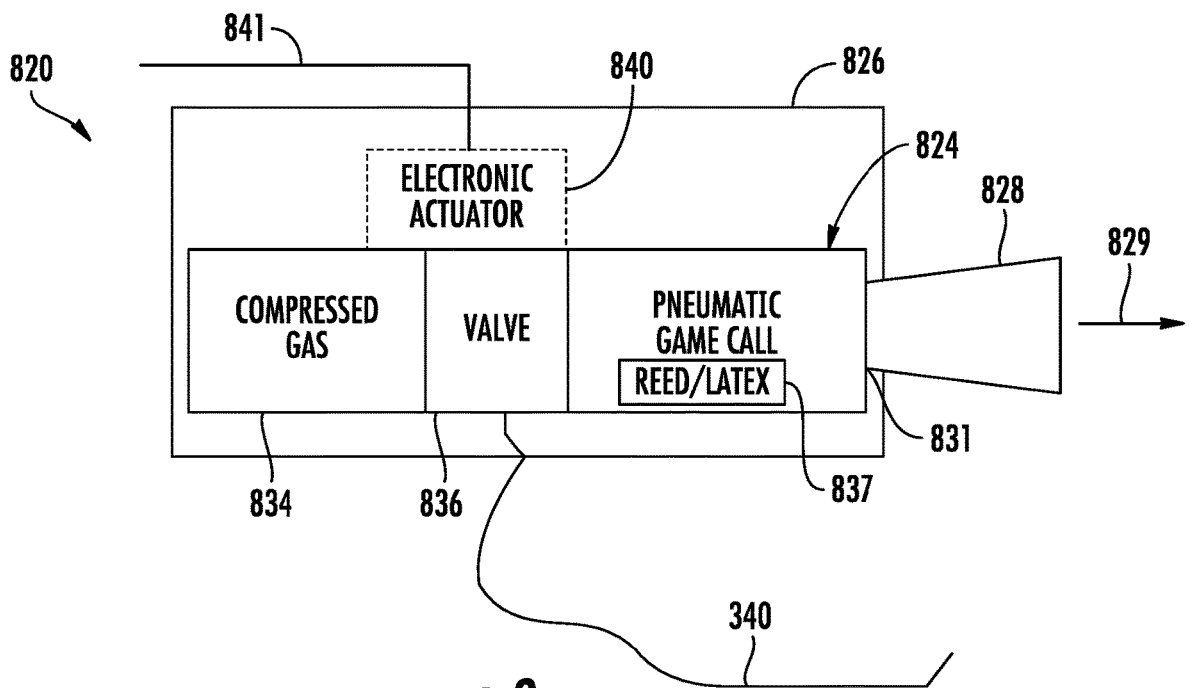
FIG. 9 is a schematic diagram of another example remote game call system.

FIG. 9 schematically illustrates portions of another example call system 820. System 820 comprises game call 824, retainer 826, megaphone 828, compressed gas source 834, valve 836 and remote actuator 340 (described above). In some implementations, system 820 may additionally comprise a ground support such as ground support 230 or 330, guide 332 and/or a game decoy such as game decoy 450, 550 or 650 as described above.

Game call 824 comprises a pneumatic game call, wherein sound is produced by the passenger travel of a gas, such as air or carbon dioxide, through or across a membrane, reed, passage or other structure to thereby produce a game attracting sound. In the example illustrated, game call 824 comprises a reed or latex structure 837 which produces sound, such as through vibration, when air or another gas passes through or over the structure.

Retainer 826 is similar to retainer 226 described above. Retainer 826 at least partially encloses game call 824 and facilitates securement of game call 824 to a stabilizing structure, such as a call support 30 or ground support 230. Retainer 826 further facilitates actuation of game call 824 by a remote actuator 340/840.

In one implementation, retainer 826 comprises a box, cage or other enclosure having openings or slots through which remote actuator 340 may interact with game call 824. In such an implementation, retainer 826 facilitates insertion and withdrawal of game call 824 into and from retainer 826 for easy exchange of game call 824 or removal of game call 874 through the simple opening of the door, latch, hook or other device. In such implementation, retainer 826 allows a person to withdraw game call 824 from retainer 826 and locally utilize or locally actuate game call 824 when desired. In another implementation, retainer 826 may comprise a bracket, platform, hanger or other device fastened, permanently or temporarily to game call 824.

Megaphone 828 comprises a funnel-shaped device for amplifying and directing sound produced by turkey call 824. Megaphone 828 directs the sound further in the direction indicated by arrow 829. In the example illustrated, megaphone 728 have a smaller end 731 supported opposite to the noise opening or air outlet of pneumatic game call 824. In one implementation, the smaller end 731 is mounted to retainer 826 with the interior of megaphone 828 communicating with the interior of retainer 826 and the noise outlet of pneumatic game call 824. In other implementations, megaphone 828 may be omitted. In some implementations, the smaller end 831 of megaphone 828 may be connected directly to pneumatic game call 824.

Compressed gas source 834 comprises a source of compressed gas. In one implementation, compressed gas course 834 comprises a source of compressed oxygen. In another implementation, compressed gas source 834 comprises a source of compressed carbon dioxide, such as a carbon dioxide canister or cartridge, such as those utilized in paint ball guns. In yet another implementation, compressed gas source 834 may comprise an elongated hollow tubular hose connected at one end to valve 836 and having a pneumatic pump at the other end. In one implementation, the pneumatic pump may be manually actuated by the wildlife observer or hunter at the remote camouflaged location, wherein the pneumatic tube or hose extends from the remote location to the location proximate the game call 824. Compressed gas source 834 is connected to a valve 836.

Valve 836 controls the emission and direction of the compressed gas from source 834. Valve 836, when actuated, releases gas from source 834 and directs a gas through an inlet of pneumatic game call 824. Valve 836 is connected to remote actuator 340, in the form of a flexible line. When an operator pulls on the flexible line forming remote actuator 340, valve 836 is opened, releasing compressed gas through pneumatic game call 824 to produce sound which is amplified and directed by megaphone 828. Upon release of the line or lessening of tension of the line forming actuator 340, valve 836 is resiliently biased to a closed state, closing the source 834 of compressed gas.

As indicated by broken lines, in some implementations, remote actuator 340 may be replaced with an electronic actuator 840. Electronic actuator 840 may comprise a magnetic switch, wherein electrical power to an electromagnet that opens valve 836. In another implementation, electronic actuator 740 may comprise other types of force generating mechanisms that when power competency force sufficient to open valve 836 and release compressed gas. As described above, in one implementation, the electronic actuator 840 may be actuated through a wired connection 841 to a remote controller. In yet another implementation, electronic actuator 840 may be actuated through wireless signals transmitted from a wireless remote controller, such as through a Bluetooth connection with a smart phone received by an associated wireless receiver (such as a Bluetooth receiver) associated with electronic actuator 840.

Figure 10:
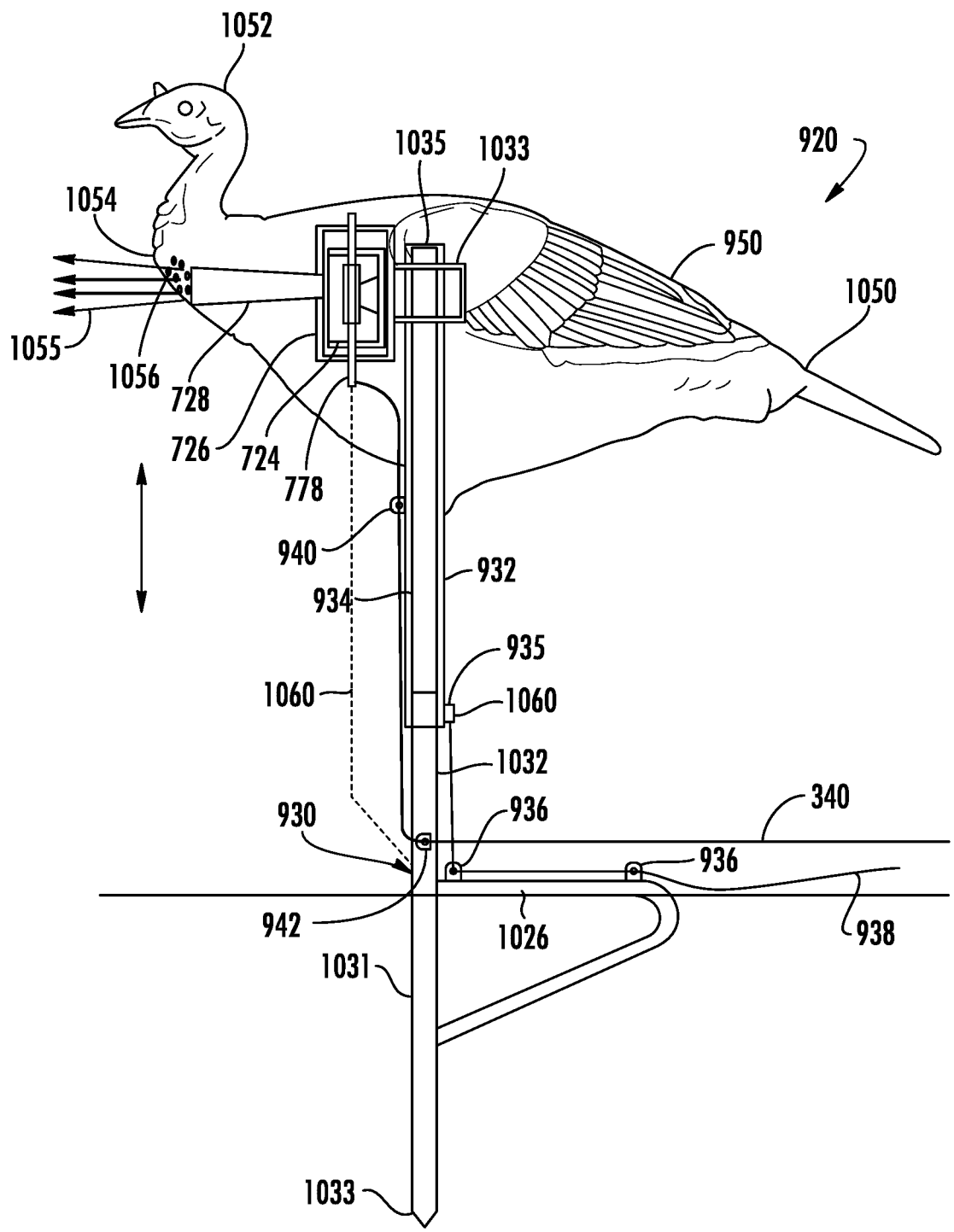
FIG. 10 is a side view of an example game call system with portions shown transparently.

FIG. 10 is a side view illustrating portions of another example game call system 920. System 920 is similar to game call system 720 described above except that system 920 additionally comprises ground support 930, decoy carrier 932, bias 934, guides 935, 936, decoy remote actuator 938, guides 940, 942, decoy 950 and call remote actuator 340.

Ground support 930 comprise a structure which supports decoy game call 724 and decoy 950 relative to an underlying terrain, such as the ground. In the example illustrated, ground support 930 comprises ground engaging portion 1031 and a support portion in the form of an upstanding post 1032. Ground engaging portion 1031 comprise a structure to support post 1032 in upstanding orientation relative to the ground or terrain. In the example illustrated, ground engaging portion 1031 comprises the end portion of a ground stake having a tapered tip 1033 to facilitate penetration of the ground stake into the ground. In the example illustrated, ground engaging portion 1031, comprising a ground state, has a length of between 4 and 8 inches, and nominally about 6 inches. Although the ground stake serving of ground engaging portion 1031 is illustrated as comprising a single rod that is penetrated into the ground, in other implementations, the ground stake serving as ground engaging portion 1031 comprises multiple spaced prongs or rods which are penetrated into the ground.

In yet other implementations, ground engaging portion 1031 comprises a platform, base or feet which extend across and upon a top of the terrain or ground, without penetrating the underlying ground. In yet other implementations, ground invasion portion may comprise both a platform, base or feet which extend across a top of the ground and a ground penetrating member that is inserted are pressed into the ground.

Upstanding post 1032 extends upwardly from ground engaging portion 1031. Upstanding post 1032 cooperates with decoy carrier 932 to facilitate vertical reciprocation of call 724 and decoy 950. In the example illustrated, upstanding post 1032 has a length of between 12 inches and 14 inches. In other implementations, upstanding post 1032 may have other lengths.

Bar 1026 comprise a structure extending sideways from ground support 930. In the example illustrated, bar 1026 comprise a foot press bar to facilitate use of a person's foot for pushing ground support 930, in the form of a ground stake, into the ground. In other implementations, in which ground support 1024 does not comprise a ground stake or a group of ground stakes, bar 1026 may comprise the platform, base or feet extends along the surface of the ground and which supports the upstanding post 1032 of ground support 930.

Decoy carrier 932 comprises a structure that slides along or relative to post 1032. In one implementation, decoy carrier 932 is coaxial with post 1032, sliding along the axis of post 1032. In the example illustrated, decoy carrier 922 comprise a hollow tube that receives portions of post 1032. In other implementations, decoy carrier 92 may comprise a rod or piston that slides within a hollow interior of post 1032. In another implementation, decoy carrier 922 may extend along an axis that is offset in parallel to the axis of post 1032. For example, decoy carrier 932 may comprise a pair of guiding rings through which post 1032 extends such that carrier 922 slide along one side of post 1032.

Decoy carrier 932 is mounted to decoy 950 such that decoy 950 vertically moves in unison with carrier 932 along post 1032. In the example illustrated, decoy carrier 932 is further mounted to game call 724 by call mount 1033 such that call 724 also vertically moves in unison with carrier 932 along post 1032. As a result, game call 724 and the supported decoy 950 move in unison with one another such that sound produced by game call 724 emanates from the same portion of decoy 950 regardless of the positioning of decoy 950 by carrier 932.

Bias 934 resiliently biased is carrier 932 relative to post 1032. In the example illustrated, bias 934 resiliently biases carrier 932 towards a raised position, wherein carrier 932 may be moved against bias 934 to a lowered position. In the example illustrated, bias 934 comprises a compression spring captured between axial end of upstanding post 1032 and an interior surface of decoy 950 or a blind and of an interior of the tube forming carrier 932. In one implementation, the compression spring forming bias 934, in a relaxed uncompressed state, extends axially beyond carrier 932 to provide an additional range of movement given the size of carrier 932. In other implementations, the end 1035 of carrier 932 is capped or occluded such that the compression spring forming bias 934 is captured between post 1032 and the occluded and. In some implementations, the compression spring 934 may encircle an upper portion of post 1032 or receive an upper portion of post 1032, wherein the lower end of the compression spring 934 bares against a shoulder formed along the outer surface of post 1032, the shoulder being receivable and slidable within the interior of carrier 932. The shoulder may be formed by an annular step about post 1032 or by a pin passing through post 1032 and projecting from the sides of post 1032.

In one implementation, carrier 932 comprise a tube having an inside diameter of 0.49 inches. In such an implementation, the spring of bias 934 comprises the compression cylinder of music wire having a free length of 11.15 inches, an outside diameter of 0.48 inches, and inside diameter of 0.404 inches, the rate of 0.684 pounds per inch, the spring index C of 11.6316 with 50.75 active coils and 52.75 total coils having a pitch of 0.2175 inches, a pitch angle of 8.9022 inches and an uncoiled length of 73.248 inches. In other implementations, carrier 932 and the spring of bias 934 may have other configurations.

Guides 936 comprise structures provided on ground support 930 that guide decoy actuator 938. In the example illustrated, guide 936 comprise islets or rings along bar 1026 that turn the flexible line forming decoy actor 938 90° come from a vertical orientation to a horizontal orientation, maintaining decoy action 938 in close proximity to a surface of the ground such that actuator 938 is less conspicuous to suspicious game.

Decoy actuator 938 comprises a mechanism by which the wildlife observer or hunter may remotely vertically reciprocate decoy 950 as well as caller 724. In the example illustrated, actuator 938 a flexible line coupled to carrier 932 at anchor 1060. Anchor 1060 comprise a structure coupled to carrier 932 and connected to flexible line 58. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member In the example illustrated, the flexible line forming actuator 938 comprises a cable, string, filament, wire or other similar elongated thin flexible, bendable line. For example, in one implementation, the flexible line may comprise transparent fishing line. Flexible line has a first end secured to anchor 1060 of carrier 932. The flexible line extends vertically from anchor 1060 downwards turns and passes through guides 936. Guides 936 direct the flexible line along bar 1026 and ultimately to a remote camouflaged location of a person using system 920.

In operation, the person at the camouflaged location pulls upon the flexible line which results in carrier 932 and decoy 950 being pulled or drawn downwards along upstanding post 1032 of ground support 930. During such time, the compression spring of bias 934 is compressed. Release or letting out of the flexible line by the person at the camouflaged location allows bias 934 to once again expand or return to a default state, lifting carrier 932 and decoy 950. In the example illustrated, decoy 950 may be moved upwards and downwards through a vertical distance or vertical range of at least 4 inches, a range of no greater than 8 inches and a range of nominally 5 inches.

Through repeated pulling and releasing of the flexible line, a person is able to quickly and easily vertically reciprocate decoy 950. Such vertical reciprocation of decoy 950 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 950 to better simulate more realistic or natural mating behavior of the female bird, the decoy 950 is more likely to appear live and entice or attract a male gendered live bird.

Guides 940 and 942 are similar to guides 936 except that guides 940942 guide movement of the flexible line forming remote call actuator 340. Guides 940 comprise islets or rings formed on carrier 932 through which the flexible line of actuator 340 extends. Guides 942 comprise islets or rings formed on ground support 930 through which the flexible line of actuator 340 extends. At least one of guides 942 may turn the flexible line from a vertical orientation to a horizontal orientation, facilitating the flexible line of actuator 340 running in close proximity to the ground.

Decoy 950 comprises a simulated body or portion of a body of wildlife to attract the targeted game. In one implementation, game call decoy 950 comprises a two-dimensional panel or sheet having a shape and printing a graphics that depict the wildlife that is to attract the targeted game. In another implementation, game call decoy 950 comprises a three-dimensional body of the wildlife that is to attract the targeted game. In one implementation, the wildlife being simulated by the decoy is of the same species as a targeted game. For example, in the illustrated example, the decoy 950 comprises a female turkey or hen that is to attract a male turkey or tom/gobbler. In other implementations, decoy 950 may simulate a wounded prey of the targeted game.

Decoy 950 has a tail portion 1050 and a head portion 1052. Decoy 950 is mounted upon carrier 932 such that megaphone 728 opens or leads towards head portion 1052 to direct admit sound produced by call 724 towards head portion 1052, simulating a natural emanation point of sound from the simulated wildlife. In the example illustrated, megaphone 728 points towards a breast portion 1054 of the simulated wildlife, the breast portion of a turkey hen, just below the neck of the turkey hen. In the example illustrated, breast portion 1054 comprises at least one opening through the otherwise generally solid imperforate exterior body of decoy 950. The opening facilitates the transmission of sound from the interior of decoy 950 to the exterior of decoy 950. In the example illustrated, the opening is in the form of a plurality of closely spaced perforations 1056 through breast portion 1054. As indicated by arrows 1055, sound produced by call 724 is amplified and directed by megaphone 728 through perforations 1056. Megaphone 728 facilitates the positioning of call 724 proximate a center of decoy 950 where more space may be available for call 724. In some implementations, megaphone 728 may be omitted.

In operation, the operator may selectively actuate call 724 by pulling or releasing the flexible line forming actuator 740. Such actuation of call 724 may occur when decoy 950 is in a raised state or in a lowered state, as chosen by the operator. In other implementations, call 724 may be actuated using the same actuator as used to raise and lower decoy 950. For example, as indicated by broken lines 1060, in another implementation, rod 778 may alternatively be connected to a flexible line or a rigid bar that is coupled to the ground support 930, such as post 1032 or bar 1026 of ground support 930. In such an implementation, the raising or lowering of carrier 932 and decoy 950 through the pulling or release of the flexible line forming actuator 938 also results in box 770 and pillar 772 being moved against bias 776 relative to the paddle 774 and rod 778 (the movement of which is inhibited by the flexible line or bar 1060) to produce a call sound. In one implementation, the connection of rod 778 to ground support 930 may be provided by a flexible line which is taught at some point such during the rising of decoy 950 to produce a sound. In another implementation, bar 1060 may be such that as decoy 950 is lowered, call 724 is actuated to produce the call sound. As described above, in some implementations, electronic actuator 740 may be provided to actuate call 724 from a remote location.

Figure 11:
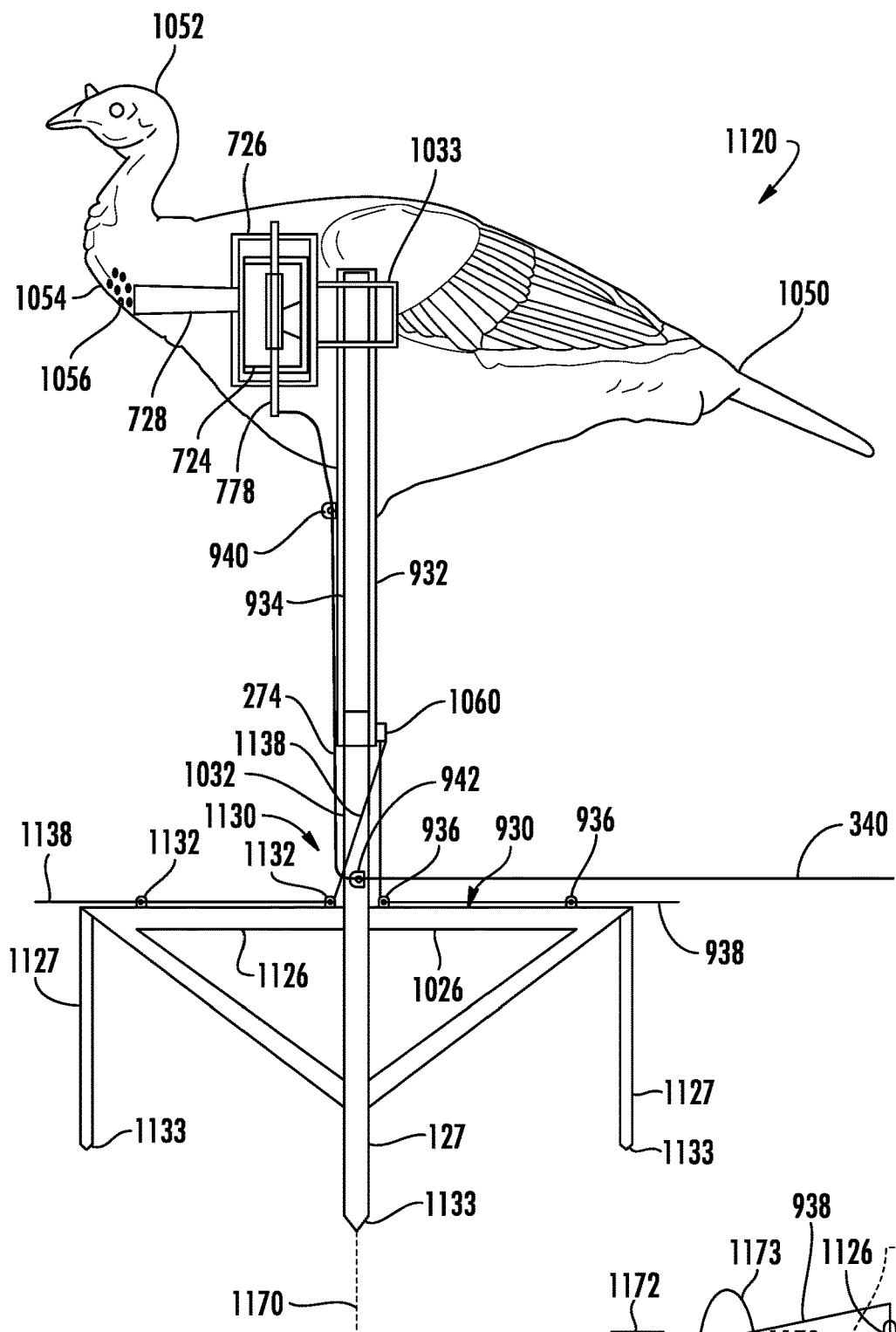
FIG. 11 is a side view of another example game call system with portions shown transparently.

FIG. 11 schematically illustrates portions of another example game call system 1120. System 1120 is similar to system 920 described above except that system 1120 provides game enticing call sounds from a decoy that may be selectively raised and lowered as well as selectively turned. System 1120 is similar to system 920 except that system 1120 comprises ground support 1130, guides 1132, actuator 1134 and position locks or position retainers 270. Those remaining components of system 1120 which correspond to components of system 920 are numbered similarly.

Ground support 1130 comprises post 1032 (described above) and ground engaging portion 1131. Ground engaging portion 1131 comprises a fork like structure having a plurality of ground engaging stakes 1127 having tapered tips 1133 to facilitate penetration of the ground stakes into the ground. In the example illustrated, each of stakes 1127 has a length of between 4 and 8 inches, and nominally about 6 inches.

Guides 1132 are similar to guides 936 in the guides 1132 extend along the horizontal portions of ground engaging portions 1131. Guides 1132 extend along portions of ground engaging portion 1131 at angularly offset locations with respect to the axis of post 1032. Guides 1132 guide movement of actuator 1138.

Figure 12:
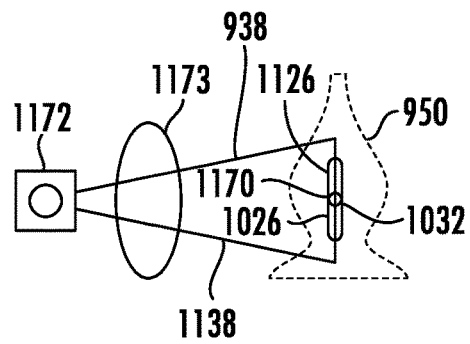

Actuator 1138 is similar to actuator 938 except that actuator 1138 extensor guides 1132. Actuator 1138 comprises a cable, string, filament, wire or other similar elongated thin flexible, bendable line. For example, in one implementation, the flexible line of actuator 1138 may comprise transparent fishing line. The flexible line of actuator 1138 has a first end secured to anchor 1160 of carrier 932 (or directly to decoy 950). The flexible line extends vertically from anchor 1060 downwards until turning and passing through guides 1132. Guides 1132 direct the flexible line along bar 26 and ultimately to a remote camouflaged location of a person using system 1120. In the example illustrated, after exiting the end most or last guide 936 or 1132 on bar 1026, 1126, both lines of actuators 938, 1138 extend into the drawing sheet or out of the drawing sheet to the person manually actuating actuators 938, 1138. FIG. 12 is an overhead view or top view illustrating actuators 938, 1138 extending from bar bars 1026, 1126 to a person 1172 behind the camouflaged or brush area 1173. Because guides 936, 1132 are angularly offset respect to one another about the axis of post 1026, sequential pulling of actuators 938, 1138 results in pivoting or rotation of decoy 950 about axis 1170.

In operation, the person 1172 at the camouflaged location pulls upon flexible line of actuator 938 which results in carrier 932 and decoy 950 being pulled or drawn downwards along upstanding post 1032 of ground support 930. During such time, the compression spring of bias 934 is compressed. Release or letting out of flexible line of actuator 938 by the person at the camouflaged location allows bias 934 to once again expand or return to a default state, lifting carrier 932 and decoy 950. In the example illustrated, decoy 950 moves upwards and downwards through a vertical distance or vertical range of at least 4 inches, a range of no greater than 8 inches and a range of nominally 5.4 inches.

Through repeated pulling and releasing of flexible line of actuator 938, a person is able to quickly and easily vertically reciprocate decoy 950. Such vertical reciprocation of decoy 950 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 950 to better simulate more realistic or natural mating behavior of the female bird, the decoy 950 is more likely to appear live and entice or attract a male gendered live bird.

Should the person 1172 desire to rotate decoy 950 about axis 1170, the person may pull flexible line 258 which results in tube 40 and decoy 950 rotating about axis 1170. In circumstances where decoy 950 is already in a fully lowered state, pulling on such line of actuator 1138 merely results in rotation of decoy 950. Alternatively, if circumstances where decoy 950 is not yet in the fully lowered state (the bottom of carrier 932 contacting the ground, the bottom of carrier contacting bar 1026 or bar 1126 or bias 934 being no longer compressible), pulling of flexible line of actuator 1138 by the person or user 1172 additionally and concurrently lowers carrier 932 and decoy 950.

After flexible line of actuator 1138 has an pulled to rotate decoy 950, decoy 950 remains in the new angular state about axis 1170 until flexible line of actuator 938 is subsequently pulled. For example, FIG. 11 illustrates decoy 950 facing to the left. In the state shown, the person may pull actuator 1138 to raise and lower decoy 950 while decoy 950 remains in the leftward looking angular orientation. As a result of actuator 938 being pulled, decoy 950 rotates to a position in which decoy 950 now faces to the right. In such a state, the person may pull actuator 938 to raise and lower decoy 950 while decoy 950 remains in the rightward looking orientation. To once again change the angular orientation of decoy 950, the user pulls on actuator 1138 to return decoy 950 to the rightward looking orientation. As a result, system 1120 allows a user to change decoy 950 to a selected angular orientation and then subsequently repeatedly raise and lower decoy 950 while decoy 950 remains in the selected angular orientation.

Figure 13:
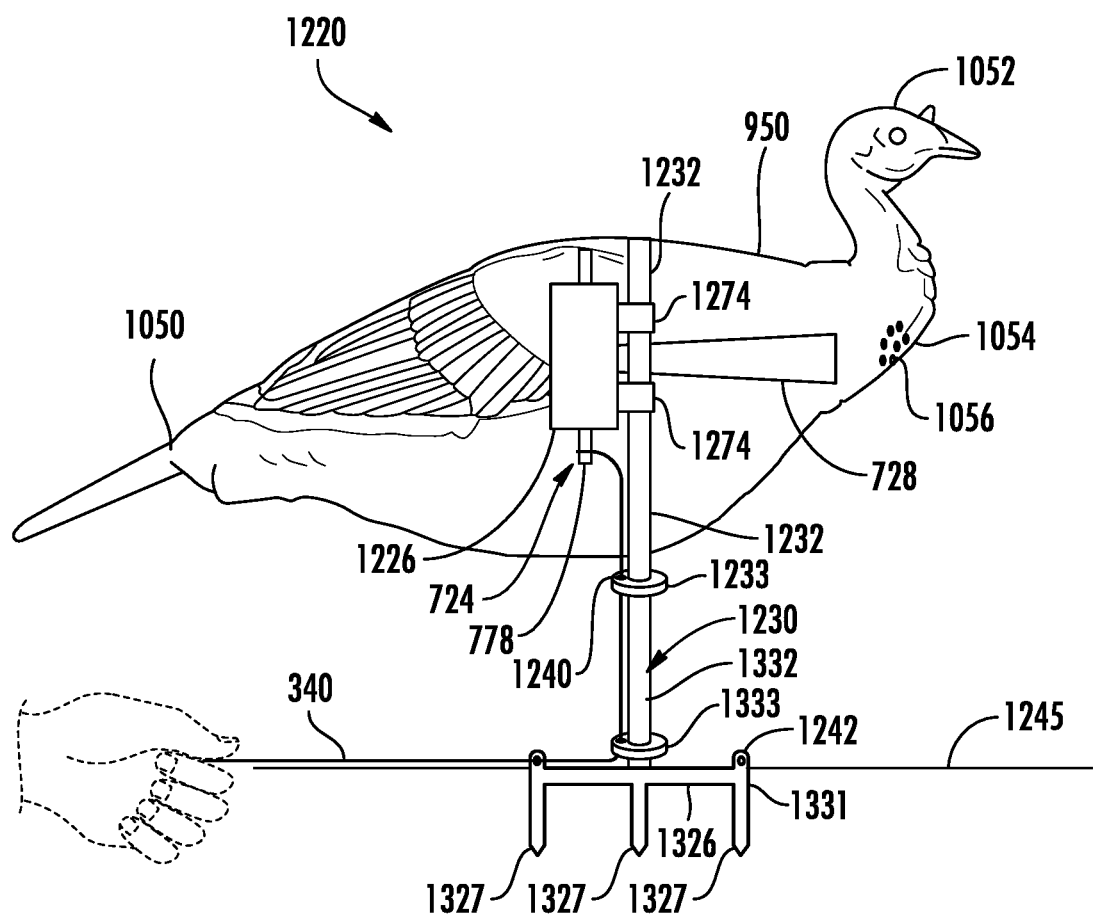
FIG. 13 is a side view of another example game call system with portions shown transparently.

FIG. 13 illustrates another example remote game call system 1220. Remote game call system 1220 is an example implementation of remote game call system 620 described above. System 1220 comprises game call 724, retainer 1226, megaphone 728, ground support 1230, carrier 1232, remote actuator 340 and decoy 950. Those components which correspond to components described above are numbered similarly. For example, game call 724 and megaphone 728 are described above with respect to FIG. 8. Decoy 950 described above with respect to FIG. 10.

Figure 14:
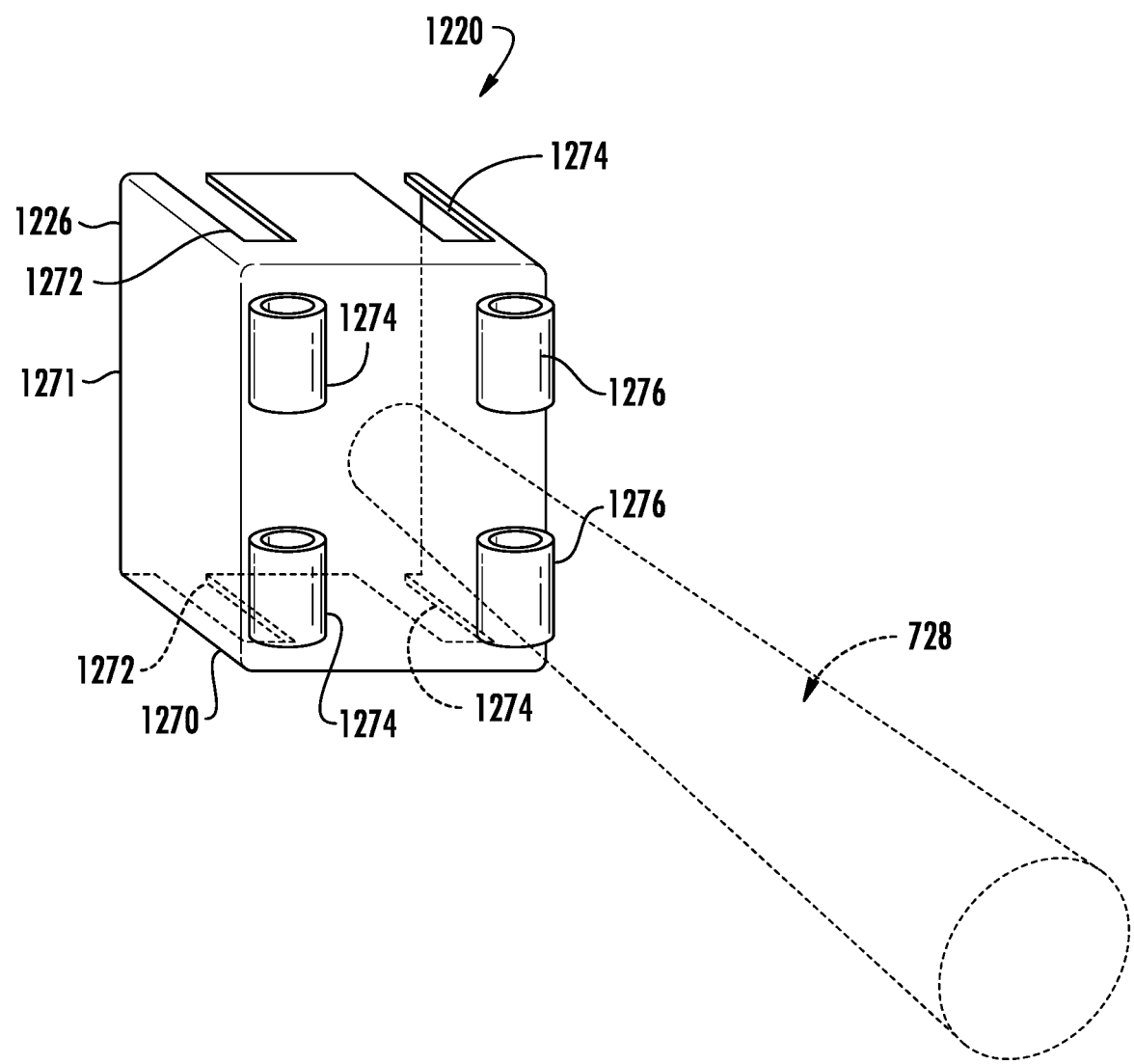
FIG. 14 is a front perspective view of an example game call retainer and megaphone of the game call system of FIG. 13.

Retainer 1226 is similar to retainer 726 described above. Retainer 1226 removably retains and partially encloses game call 724. Retainer 1226 further facilitate the mounting of game call 724 to carrier 1232. FIG. 14 illustrates retainer 1226 and megaphone 728 in more detail. FIGS. 15-17 illustrate retainer 1226 and megaphone 728, with retainer 1226 mounted to carrier 1232. As shown by FIGS. 14-17, retainer 1226 comprises a box 1270 having an open side 1271 into which game call 724 may be inserted with the opening 780 of game call 724 facing megaphone 728. Box 1270 comprises a first pair of slots 1272 and a second pair of slots 1274. Slots 1272 and 1274 provide openings in box 1270 through which opposite end portions of rod 778 may project from the interior of box 1270. Because box 1270 comprises two pairs of such slots 1272, 1274, retainer 1226 may accommodate both left-handed and right-handed push-pull turkey box calls.

As further shown by FIG. 14-17, retainer 1226 further comprises a first pair of spaced rings 1274 and a second pair of spaced rings 1276. Rings 1274, 1276 project from box 1270 and are sized to receive carrier 1232. Because retainer 1226 comprises two pairs of such rings 1274, 1276, retainer 1226 may accommodate both left-handed and right-handed mounting of retainer 1226 to carrier 1232.

FIGS. 15 and 16 illustrate carrier 1232 mounted to retainer 1226 via rings 1276. FIG. 17 illustrates carrier 1232 mounted to retainer 1226 via rings 1274. As shown by FIGS. 13 and 16, carrier 1232 comprises a lower flange 1233 having an opening which serves as a guide 1240 for remote actuator 340. In the example illustrated, carrier 1232 comprises an elongate hollow tube which slides over an upstanding or upright rod portion of the ground support 1230. In some implementations, carrier 1232 may be omitted, wherein retainer 1226 directly mounts to the upstanding post of ground support 1230.

Ground support 1230 supports carrier 1232, game call 724 and decoy 950 above the underlying ground terrain 1245. Ground support 1230 comprises ground engaging portion 1331 and support portion 1332. Ground engaging portion 1331 comprises a generally horizontal bar 1326 from which a plurality of stakes 1327 extend for insertion into ground 1245.

Support portion 1332 comprise an upstanding post extending upwards from bar 1326. Support portion 1332 is inserted into carrier 1232. Support portion 1332 comprises a ring 1333 which assist in guiding remote actuator 340. In the example illustrated, guides 1242 further extent upwards from bar 13262 further assist in guiding movement of remote actuator 340.

Remote actuator 340, described above, comprises a flexible line that extends through guides 1242, through ring 1333 and through guide 1240 two a connection with rod 778 of game call 724. Pulling of the flexible line of remote actuator 340 results in panel 774 being moved along, against and relative to pillar 772, against bias 776 (each of such elements shown in FIG. 8), to create the game call sound. Release of the line forming actuator 340 allows bias 776 to return rod 778 to its initial state. Sound produced by game call 724 is directed and amplified by megaphone 728 towards perforations 1056 in breast portion 1054 of decoy 950.

Figure 18:
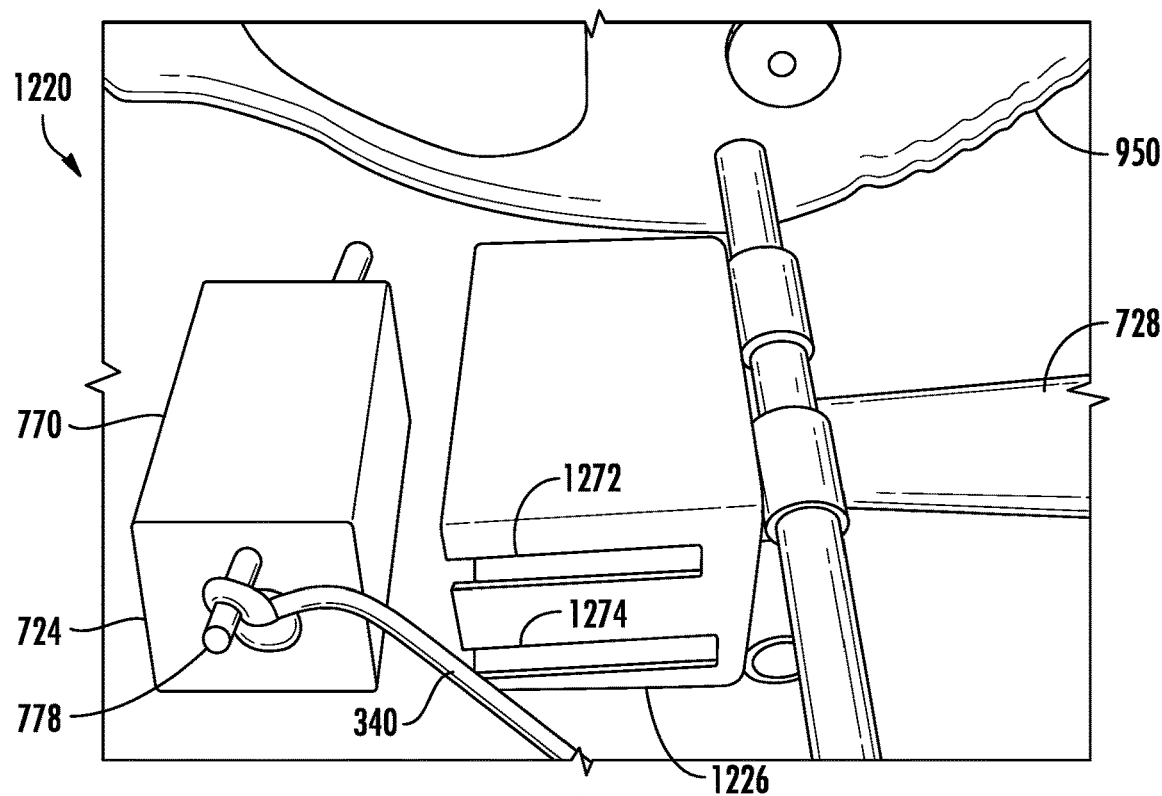
FIG. 18 is a perspective view of an example game call prior to insertion into the example game call retainer and prior to insertion into an example decoy.
Figure 19:
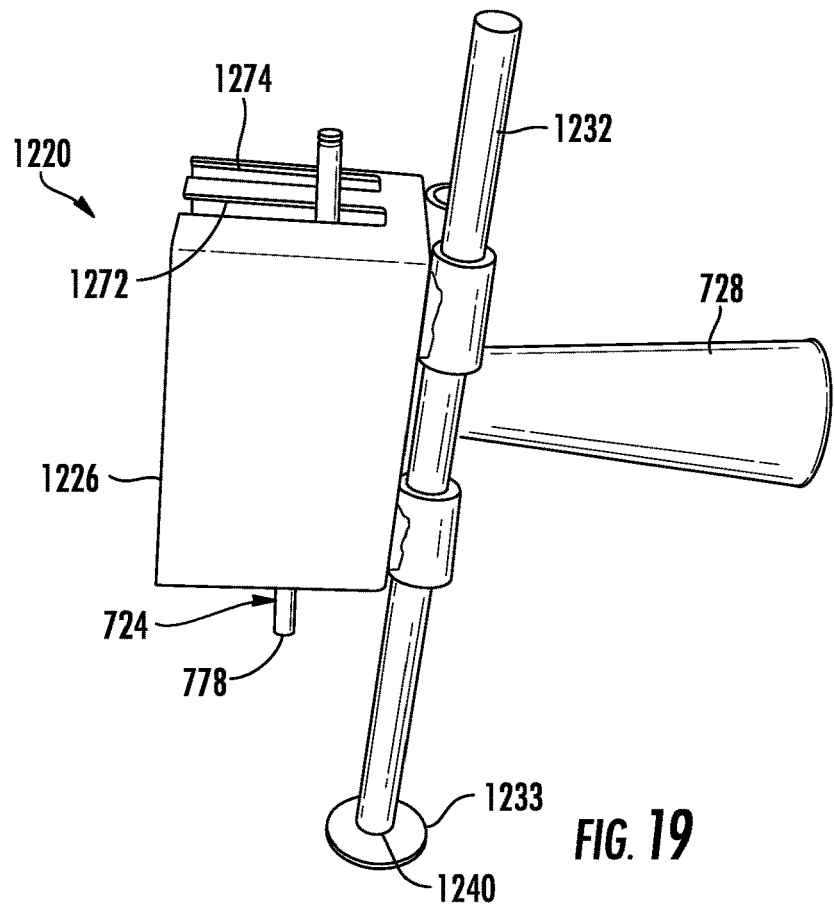
FIG. 19 is a perspective view of the example game call inserted into the example game call retainer, FIG. 19 further illustrating the example game call retainer mounted to the example carrier.
Figure 20:
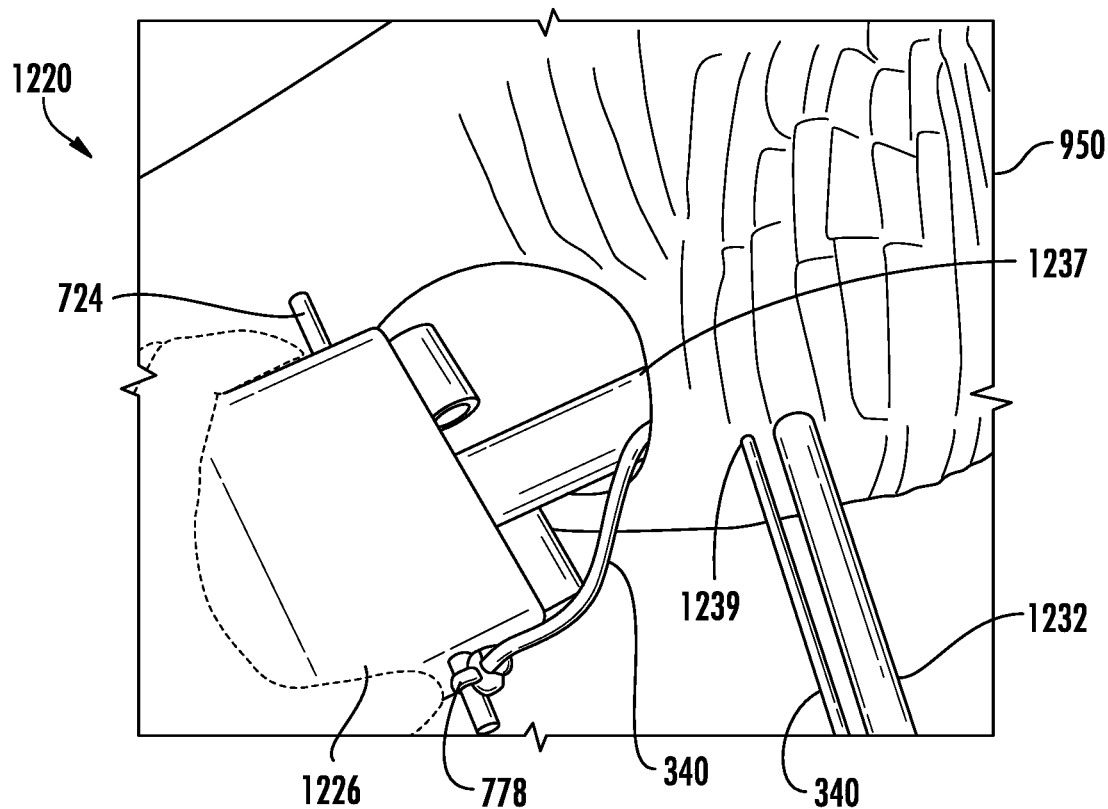
FIG. 20 is a bottom perspective view illustrating insertion of the example retainer with the received example game call being inserted into an example decoy and prior to mounting to the example carrier.
Figure 21:
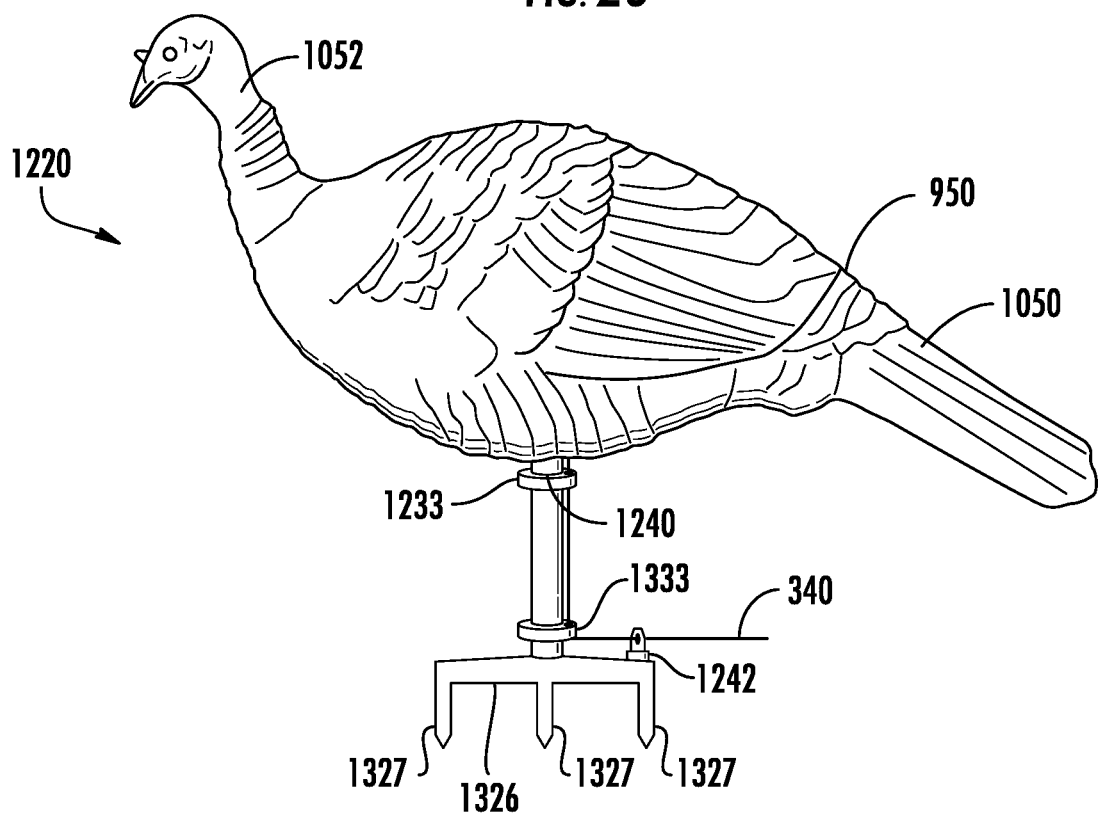
FIG. 21 is a perspective view of the example decoy with the inserted retainer and received game call.

FIGS. 18-21 illustrate the assembly of system 1220. FIG. 18 is an exploded perspective view illustrating game call 724 prior to insertion into retainer 1226. FIG. 19 illustrates call 724 inserted into retainer 1226 with rod 778 projecting through slots 1272. FIG. 20 illustrates retainer 1226 and the received call 724, separated from carrier 1232 being inserted through an opening 1237 in a lower and of decoy 950. Remote actuator 340 is illustrated as being connected to rod 778 of call 724, and as extending through an opening 1239 in decoy 950 alongside the opening in decoy 950 through which carrier 1232 extends. In one example method of assembly, retainer 1226 and the received call 724 is inserted through opening 1237 and rings 1274 (or rings 1276) are aligned with a top end into decoy 950 through the aligned rings 1274 of carrier 1232 within the interior of decoy 950. Once aligned, carrier 1232 is moved further into decoy 950, through the aligned rings 1272. FIG. 21 illustrates the assembled system 1220.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A remote game call system comprising:
a game call;
a flexible line connected to the game call, wherein pulling of the line actuates the game call;
a game decoy, wherein the game call is received within the decoy; and
a megaphone extending from the game call towards an exterior of the decoy.

2. The system of claim 1 further comprising a support coupled to the game call to releasably or removably connect the game call to a stabilizing structure.

3. The system of claim 2, wherein the support comprises a ground support comprising a ground engaging portion and a support portion to extend above the ground.

4. The system of claim 3, wherein the ground support guides movement of the flexible line.

5. The system of claim 4, wherein the ground support supports the decoy and supports the game call within the decoy.

6. The system of claim 5, wherein the decoy is movable relative to the ground support and wherein the game call is movable in unison with the decoy relative to the ground support.

7. The system of claim 6 further comprising a carrier coupled to the decoy and movable relative to the ground support.

8. The system of claim 6, wherein the decoy and the game call are rotatable relative to the ground support.

9. The system of claim 6, wherein the decoy and the game call are vertically movable relative to the ground support.

10. The system of claim 6, wherein the decoy and the game call are concurrently vertically movable and rotatable relative to the ground support.

11. The system of claim 3, wherein the call comprises a game box call.

12. The system of claim 1, wherein the game decoy comprises an imperforate outer wall and a perforate portion, the megaphone extending towards the perforate portion.

13. The system of claim 12, wherein the perforate portion is located at a forward portion of the decoy, proximal a head of the game decoy and distal a tail of the game decoy.

14. A remote game caller system comprising:
a ground support comprising a ground engaging portion and a support portion to extend above the ground;
a game decoy supported by the ground support;
a game call supported proximate the game decoy; and
an actuator for remotely actuating the game call, wherein the actuator comprises:
a local electrical driver to move portions of the game call; and
a remote controller to communicate with the local electrical driver.

15. The system of claim 14, wherein the remote controller wirelessly communicates with the local electrical driver.

16. The system of claim 14 further comprising a carrier carrying the decoy, the carrier being movable relative to the ground support.

17. The system of claim 16, wherein the carrier further carries the game call such that the game call and the game decoy are movable in unison relative to the ground support.

18. The system of claim 17 further comprising a second actuator coupled to the carrier to selectively move the carrier relative to the ground support.

19. The system of claim 16, wherein the carrier is vertically movable relative to the ground support.

20. The system of claim 16, wherein the carrier is rotatable relative to the ground support.

21. The system of claim 16, wherein the carrier is concurrently rotatable and vertically movable relative to the ground support and wherein were in the carrier further carries the game call.

22. The system of claim 16, wherein the game call is received within the game decoy.

23. The system of claim 22 further comprising a megaphone received within the decoy and extending from the game call towards an exterior of the game decoy.

* * * * *